United States Patent
Tran et al.

(10) Patent No.: US 12,166,562 B2
(45) Date of Patent: Dec. 10, 2024

(54) GROUP-BASED SCELL BEAM FAILURE RECOVERY

(71) Applicant: Panasonic Intellectual Property Corporation of America, Torrance, CA (US)

(72) Inventors: Xuan Tuong Tran, Singapore (SG); Lei Huang, Singapore (SG); Tien Ming Benjamin Koh, Singapore (SG); Yang Kang, Singapore (SG); Hidetoshi Suzuki, Kanagawa (JP); Ankit Bhamri, Langen (DE); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 376 days.

(21) Appl. No.: 17/633,914

(22) PCT Filed: Jun. 16, 2020

(86) PCT No.: PCT/SG2020/050337
§ 371 (c)(1),
(2) Date: Feb. 8, 2022

(87) PCT Pub. No.: WO2021/029824
PCT Pub. Date: Feb. 18, 2021

(65) Prior Publication Data
US 2022/0294520 A1  Sep. 15, 2022

(30) Foreign Application Priority Data
Aug. 13, 2019  (SG) .............. 10201907430S

(51) Int. Cl.
*H04B 7/08* (2006.01)
*H04W 24/10* (2009.01)
*H04W 76/19* (2018.01)

(52) U.S. Cl.
CPC ............ *H04B 7/088* (2013.01); *H04W 24/10* (2013.01); *H04W 76/19* (2018.02)

(58) Field of Classification Search
CPC .... H04B 7/0695; H04B 7/088; H04B 7/0408; H04B 7/0617; H04B 7/022;
(Continued)

(56) References Cited

U.S. PATENT DOCUMENTS

2020/0322813 A1  10/2020  Jia et al.
2021/0013948 A1*  1/2021  Agiwal ................. H04W 80/02
(Continued)

FOREIGN PATENT DOCUMENTS

WO  2019/027294 A1  2/2019
WO  WO 2019032882 A1  2/2019
(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).
(Continued)

*Primary Examiner* — Awet Haile
(74) *Attorney, Agent, or Firm* — Seed IP Law Group LLP

(57) ABSTRACT

A communication apparatus includes a receiver and circuitry. The receiver receives configuration information for beam failure recovery (BFR) of a plurality of secondary cells (SCells) operating in a network. The circuitry performs beam failure detection (BFD) and reports based on the configuration information.

16 Claims, 14 Drawing Sheets

(58) Field of Classification Search
CPC . H04B 7/06964; H04B 7/0626; H04W 76/19; H04W 16/28; H04W 24/10; H04W 76/18; H04W 72/046; H04W 76/01; H04L 5/001; H04L 5/0094
See application file for complete search history.

(56) References Cited

U.S. PATENT DOCUMENTS

| | | | | |
|---|---|---|---|---|
| 2021/0028849 | A1* | 1/2021 | Chin | H04B 7/06964 |
| 2022/0061087 | A1* | 2/2022 | Koskela | H04W 72/21 |
| 2022/0271817 | A1* | 8/2022 | Lee | H04B 17/336 |
| 2022/0294582 | A1* | 9/2022 | Zhang | H04B 1/74 |

FOREIGN PATENT DOCUMENTS

| | | |
|---|---|---|
| WO | 2019/134092 A1 | 7/2019 |
| WO | 2019/135654 A1 | 7/2019 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

International Search Report, mailed Sep. 23, 2020, for International Application No. PCT/SG2020/050337. (5 pages).

Extended European Search Report, dated Aug. 19, 2022, for European Patent Application No. 20852435.5-1206. (10 pages).

Intel Corporation, "Summary om L1-SINR and SCell BFR," R1-1907674, Agenda item: 7.2.8.3, 3GPP TSG RAN WG1 Meeting #97, Reno, USA, May 13-17, 2019. (21 pages).

Ericsson, "Enhancements to multi-beam operation," Tdoc R1-1907436, Agenda Item: 7.2.8.3, 3GPP TSG-RAN WG1 Meeting #97, Reno, USA, May 13-17, 2019, 17 pages.

Intel Corporation, "On Beam Management Enhancement," R1-1812507, Agenda item: 7.2.8.3, 3GPP TSG RAN WG1 Meeting #95, Spokane, USA, Nov. 12-16, 2018. (10 pages).

Nokia, Nokia Shanghai Bell, "Enhancements on Multi-beam Operation," R1-1907317, Agenda item: 7.2.8.3, 3GPP TSG RAN WG1 #97 Meeting, Reno, Nevada, USA, May 13-17, 2019. (18 pages).

OPPO, "Discussion on Multi-beam Operation Enhancements," R1-1906288, Agenda Item: 7.2.8.3, 3GPP TSG RAN WG1 #97, Reno, USA, May 13-17, 2019. (10 pages).

Vivo, "Discussion on Multi-Beam Operation," R1-1900138, Agenda Item: 7.2.8.3, 3GPP TSG RAN WG1 Ad-Hoc Meeting 1901, Taipei, Jan. 21-25, 2019. (10 pages).

* cited by examiner

```
SCellBFRConfigInfo::=SEQUENCE{                    //SCell BFR configuration IE
Option              CHOICE{
SCell-basedBFRInfo     SEQUENCE {...},            // Conventional BFR per SCell based on the BFR specified in Rel. 15
Group-basedSCellBFRInfo Group-basedSCellBFRInfo-IE, //Indication of the configuration information of group-based SCell BFR
}}

Group-basedSCellBFRInfo-IE::=SEQUENCE (SIZE (1..maxGroupNr){ OF SCellGroup  // The proposed group-based SCell BFR IE
BFRGroupList        SEQUENCE{
    GroupIndex      INTEGER (1..maxGroupNr),                                  // Group index
    Cell_List       SEQUENCE{SIZE (1..maxNrofSCell)},                         // List of CCs of each group
    BFD             ENUMERATED{Opt. 1a, Opt. 1b, Opt. 2, Opt. 3a, Opt. 3b},   // Detect BF of the group based on 5 options
    BFreport        Groupidentifier{Group ID, indicated CC, configuration index order}, //Indicate group identifier to be reported
    MI              RSRP-Range                                                 OPTIONAL,  // Indicate to report RSRP of the failed group
    Reason          ENUMERATED{initial, UE mobility, blockage, UE rotation} OPTIONAL, // A known reason for BF event
    BFreportlink    ENUMERATED{PCell (PsCell) UL, SCell UL},                  // Indicate link for BF report
    Newbeam         NBInfo{CC index, spatial Rx, AoA} OPTIONAL,               // Provide new beam information
...}
}
```

```
ENUMERATED {SCell-basedBFRInfo, Group-basedSCellBFRInfo, both},
```

| | Group information | Beam failure detection configuration information | | Beam failure detection report configuration information | | | |
|---|---|---|---|---|---|---|---|
| Group index | Cell_List | BFD | BFreport | MI | BFreportLink | Reason | Newbeam |
| 1 | CC1, CC3, CC5 | Opt. 1a | Group index | RSRP_02 | PCell UL | Initial | No |
| 2 | PCell, CC2, CC6 | Opt. 2 | PCell | RSRP_05 | PCell UL | UE mobility | No |
| 3 | CC7, CC8 | Opt. 3b | CC7 | RSRP_10 | SCell UL | Blockage | No |

GROUP-BASED SCELL BEAM FAILURE RECOVERY

TECHNICAL FIELD

The present disclosure generally relates to communication apparatus and methods for electronic devices and systems, and more particularly relates to beam failure recovery of a plurality of secondary cells (SCells) operating in a network.

BACKGROUND

Since wireless networks operate at higher frequency bands such as millimeter wave (mmWave) communications, the communication apparatuses are equipped with large antenna arrays. That enables to transmit signals in multitude of links with very narrow beams. These networks offer numerous advantages over traditional networks such as very high data rate transmissions, but also include issues relating to management of multi-beam operations and recovery protocol when beam failures occur in the network.

Currently, only the beam failure recovery procedure for primary cell (PCell) and primary secondary cell (PsCell) was specified in 3GPP Release (Rel.) 15 for 5G standards. There has been little discussion on communication apparatuses and methods for beam failure recovery in context of group-based secondary cells (SCells).

SUMMARY

One non-limiting and exemplary embodiment facilitates providing enhancements on multi-beam operations in wireless networks. By way of example, this embodiment includes group-based SCell beam failure recovery in a network. It provides effective solutions to simultaneously recover beam failure of a plurality of SCells configured to operate in the network.

According to the present disclosure, there is provided a communication apparatus comprising a receiver, which, in operation, receives configuration information for beam failure recovery (BFR) of a plurality of SCells operating in a network, and circuitry, which, in operation, performs beam failure detection (BFD) and report based on the configuration information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 10 shows configuration information for beam failure recovery (BFR) for multiple SCells based on group basic scenario according to an example embodiment.

FIG. 11 shows a table of group-based SCell BFR configuration information according to an example embodiment.

Figure 1:
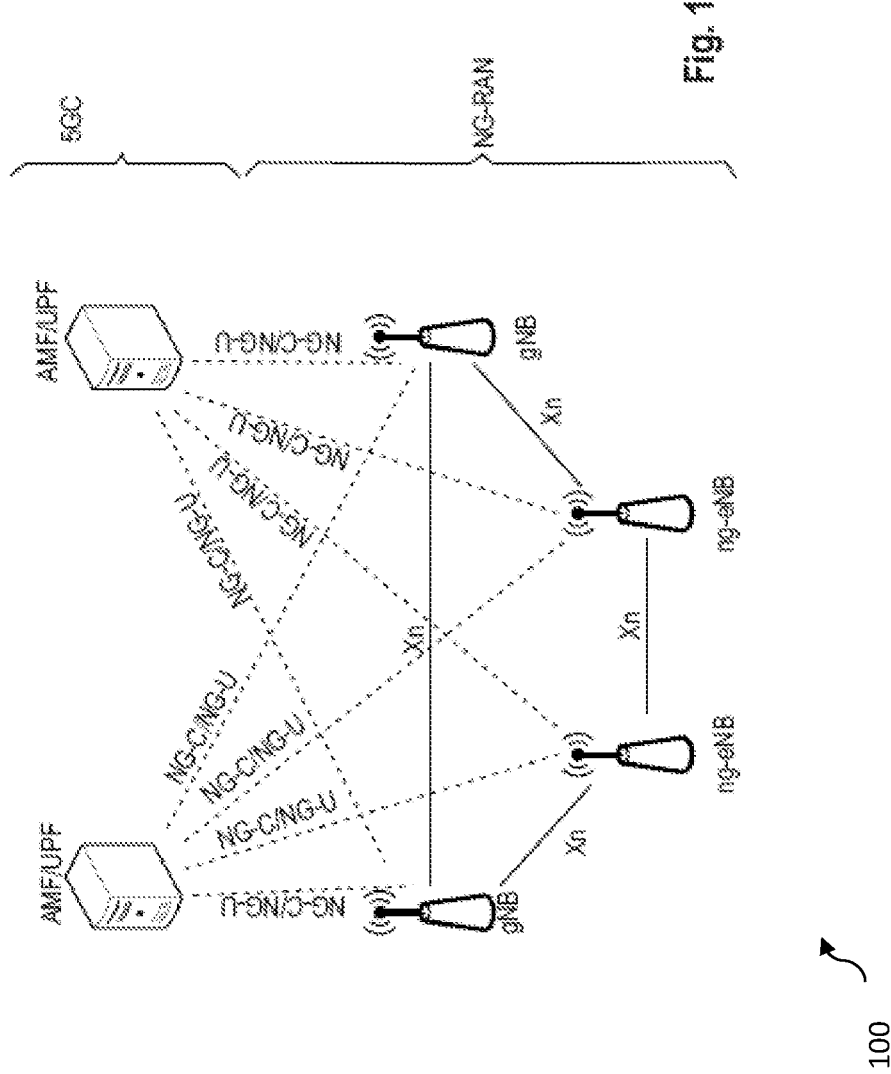
FIG. 1 shows an exemplary architecture for a 3GPP New Radio (NR) system.

Skilled artisans will appreciate that elements in the figures are illustrated for simplicity and clarity and have not necessarily been depicted to scale.

DETAILED DESCRIPTION

Some embodiments of the present disclosure will be described, by way of example only, with reference to the drawings. Like reference numerals and characters in the drawings refer to like elements or equivalents.

5G NR System Architecture and Protocol Stacks

3GPP has been working at the next release for the 5th generation cellular technology, simply called 5G, including the development of a new radio (NR) access technology operating in frequencies ranging up to 100 GHz. A 'Non-Stand-Alone' (NSA) NR specifications for 5G standards was initially delivered in late 2017. In 2018, the 3GPP Release 15—the first version of 5G standards—was completed to cover 'stand-alone' (SA) 5G with a new radio system, which allows proceeding to 5G NR standard-compliant trials and commercial deployments of smartphones.

Among other things, the overall system architecture assumes an NG-RAN (Next Generation—Radio Access Network) that comprises gNBs, providing the NG-radio access user plane (SDAP/PDCP/RLC/MAC/PHY) and radio resource control (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the 5G new radio system, for each numerology and carrier, a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
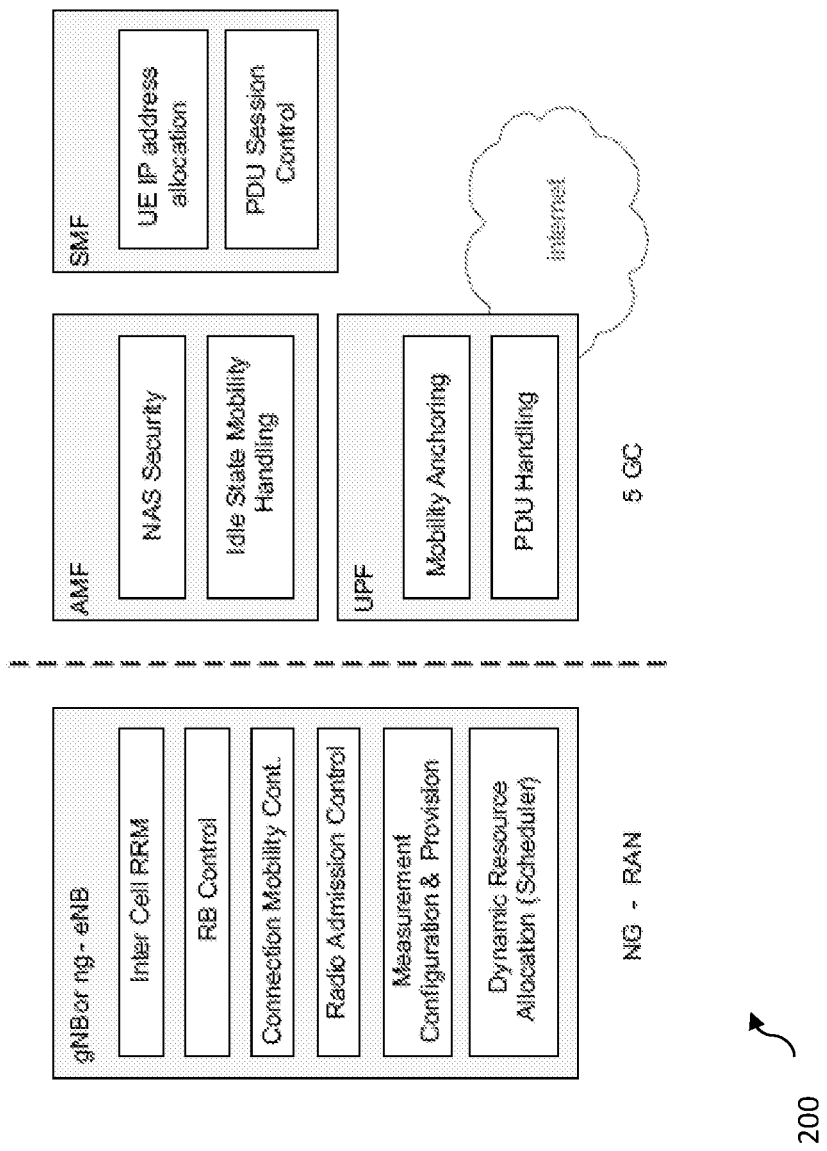
FIG. 2 is a schematic drawing which shows functional split between next generation-radio access network (NG-RAN) and 5G core network (5GC).

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;
Mobility management control (subscription and policies);
Support of Network Slicing;
Session Management Function, SMF, selection.

Furthermore, the User Plane Function, UPF, hosts the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:

Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
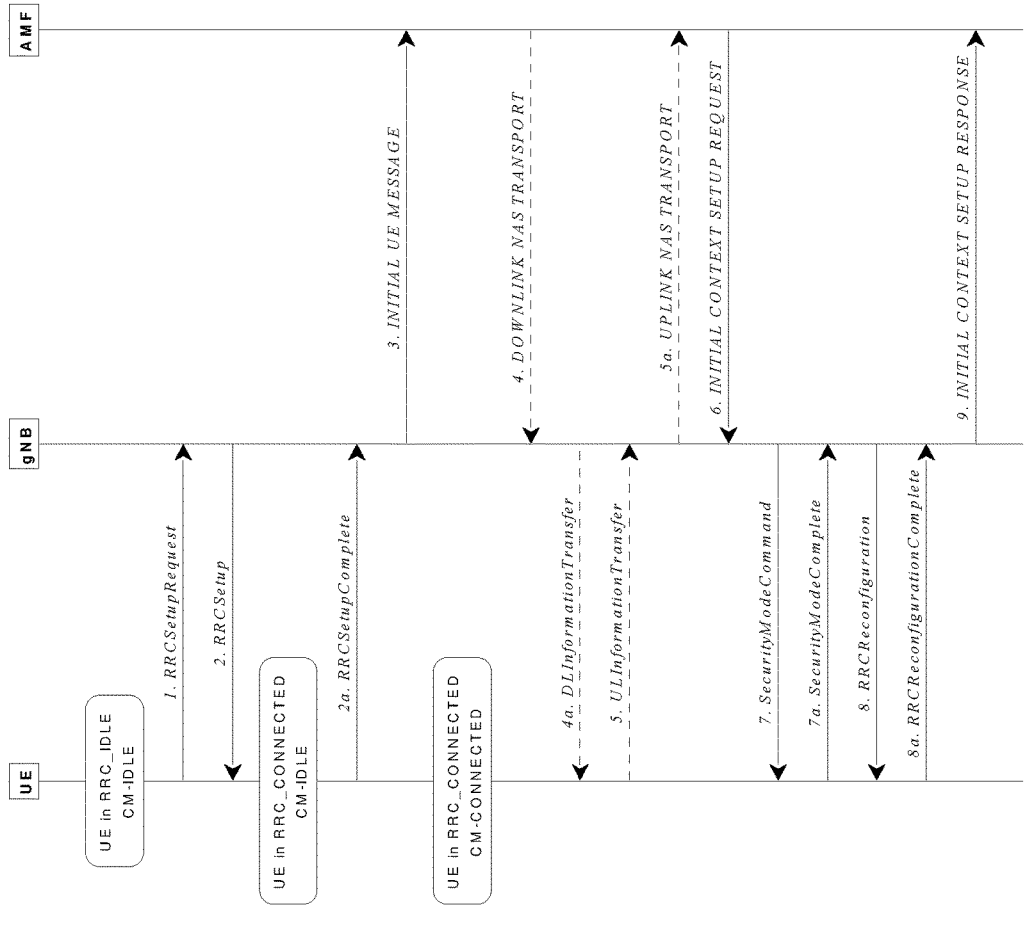
FIG. 3 is a sequence diagram for radio resource control (RRC) connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
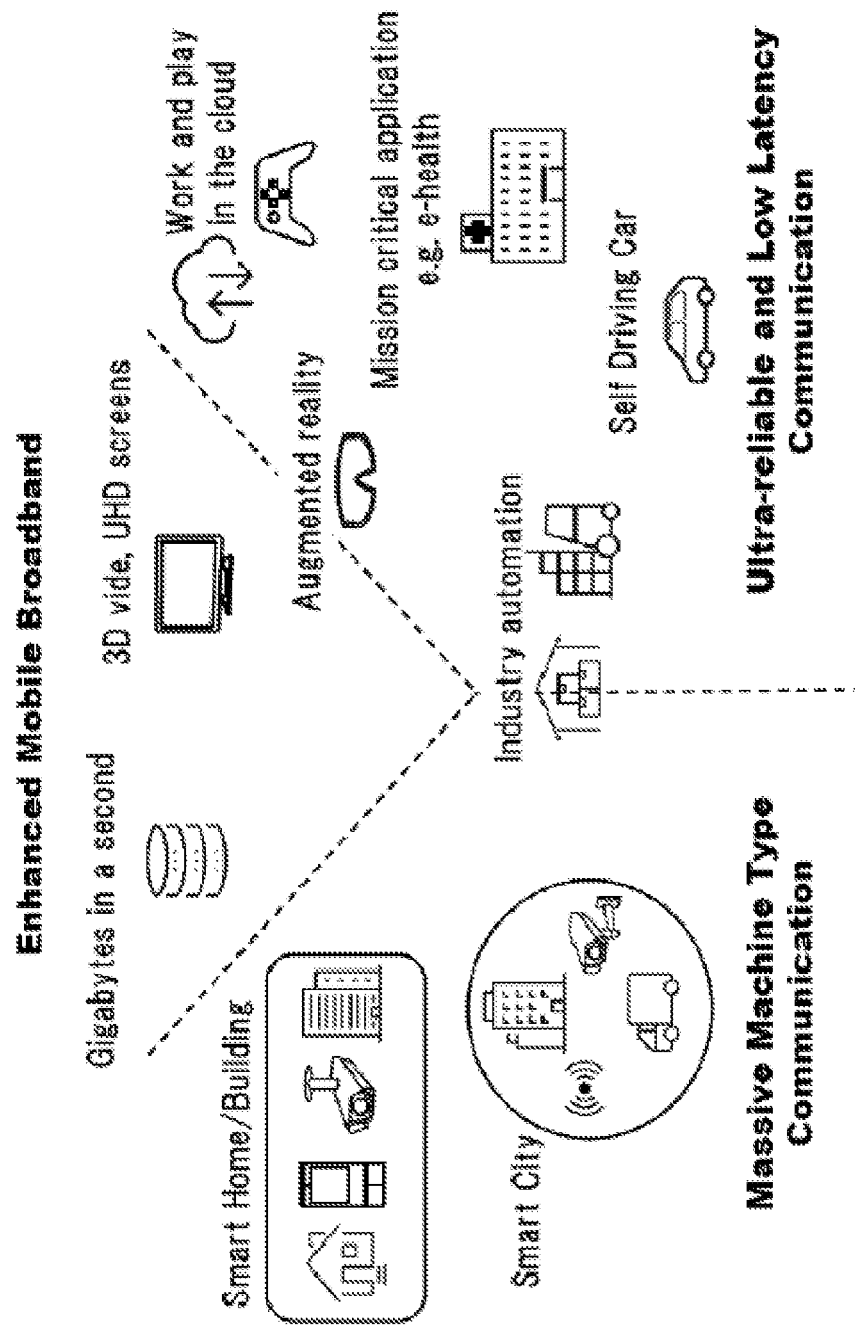
FIG. 4 is a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
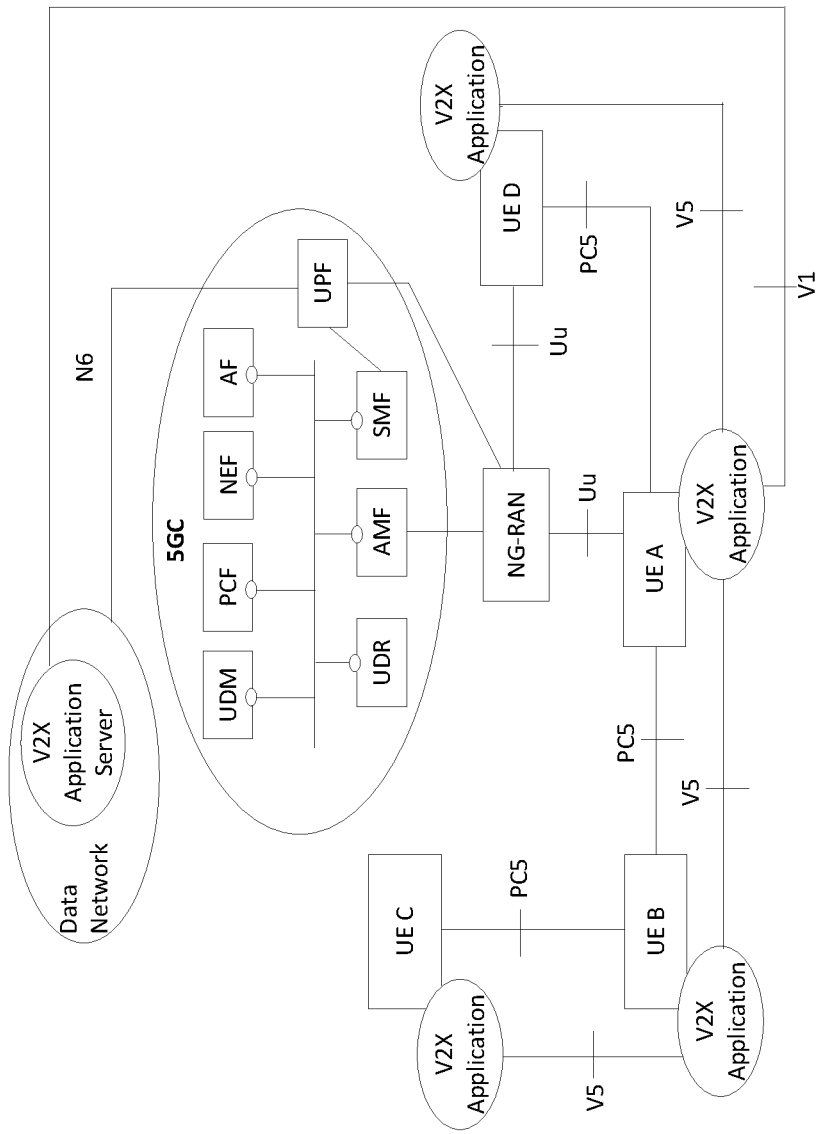
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc) of the 5GC to establish a PDU session including a radio bearer between a gNodeB and a UE in accordance with the QoS requirement and control circuitry, which, in operation, performs the services using the established PDU session.

In the following paragraphs, certain exemplifying embodiments are explained with reference to a gNB and a UE for beam failure recovery operation, especially in a MIMO wireless network.

Figure 6A:
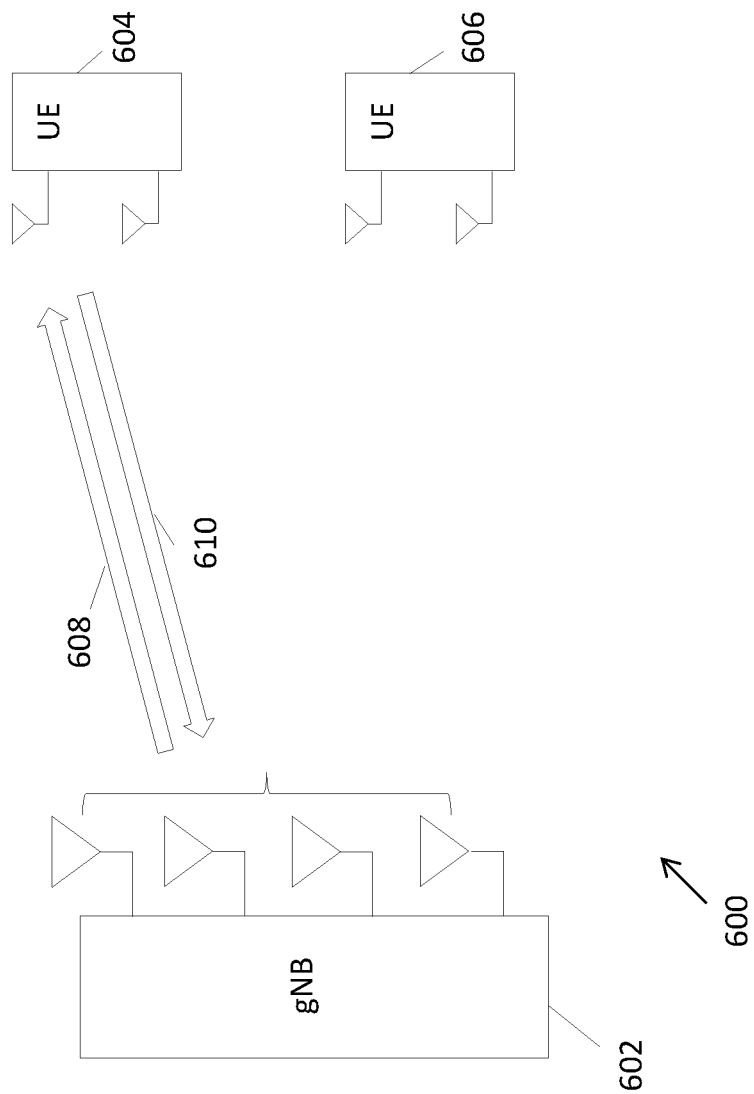
FIG. 6A depicts a schematic diagram of uplink and downlink multiple-input multiple-output (MIMO) communications between a base station (gNB) and a user equipment (UE) in a MIMO wireless network.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure. FIG. 6A depicts a schematic diagram of single user (SU) MIMO communications 100 between a base station (gNB) 602 and a user equipment (UE) 604 in a MIMO wireless network. As shown, the MIMO wireless network may include one or more UEs (e.g. UE 604, UE 606, etc.). In the SU-MIMO communications 600, the gNB 602 transmits multiple space-time streams using multiple antennas (e.g. four antennas as shown in FIG. 6A) with all the space-time streams directed to a single communication apparatus, i.e. the UE 604. For the sake of simplicity, the multiple space-time streams directed to the UE 104 are illustrated as a grouped data transmission arrow 108 directed to the UE 604.

The SU-MIMO communications 600 can be configured for bi-directional transmissions. As shown in FIG. 6A, in the SU-MIMO communications 100, the UE 604 may transmit multiple space-time streams using multiple antennas (e.g. two antennas as shown in FIG. 6A) with all the space-time streams directed to the gNB 602. For the sake of simplicity, the multiple space-time streams directed to the gNB 602 are illustrated as a grouped data transmission arrow 110 directed to the gNB 602.

As such, the SU-MIMO communications 600 depicted in FIG. 6 enables both uplink and downlink SU transmissions in a MIMO wireless network.

Figure 6B:
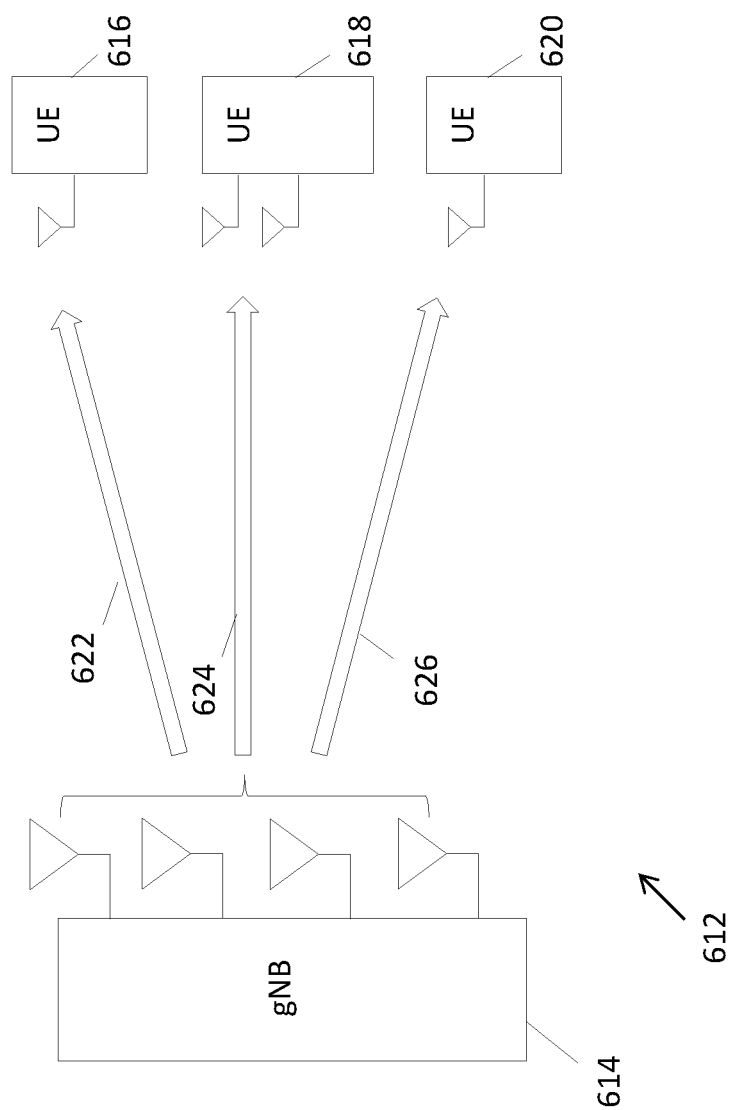
FIG. 6B depicts a schematic diagram of downlink multi-user MIMO (MU-MIMO) communications between a gNB and multiple UEs in a MIMO wireless network.

FIG. 6B depicts a schematic diagram of downlink MU-MIMO communications 612 between a gNB 614 and multiple UEs 616, 618, 620 in a MIMO wireless network. The MIMO wireless network may include one or more UEs (e.g. UE 616, UE 618, UE 620, etc.). In the downlink MU-MIMO communications 112, the gNB 614 transmits multiple streams simultaneously to the UEs 616, 618, 620 in the network using multiple antennas via spatial mapping or precoding techniques. For example, two space-time streams may be directed to the UE 618, another space-time stream may be directed to the UE 616, and yet another space-time stream may be directed to the UE 620. For the sake of simplicity, the two space-time streams directed to the UE 618 are illustrated as a grouped data transmission arrow 624, the space-time stream directed to the UE 616 is illustrated as a data transmission arrow 622, and the space-time stream directed to the UE 620 is illustrated as a data transmission arrow 626.

Figure 6C:
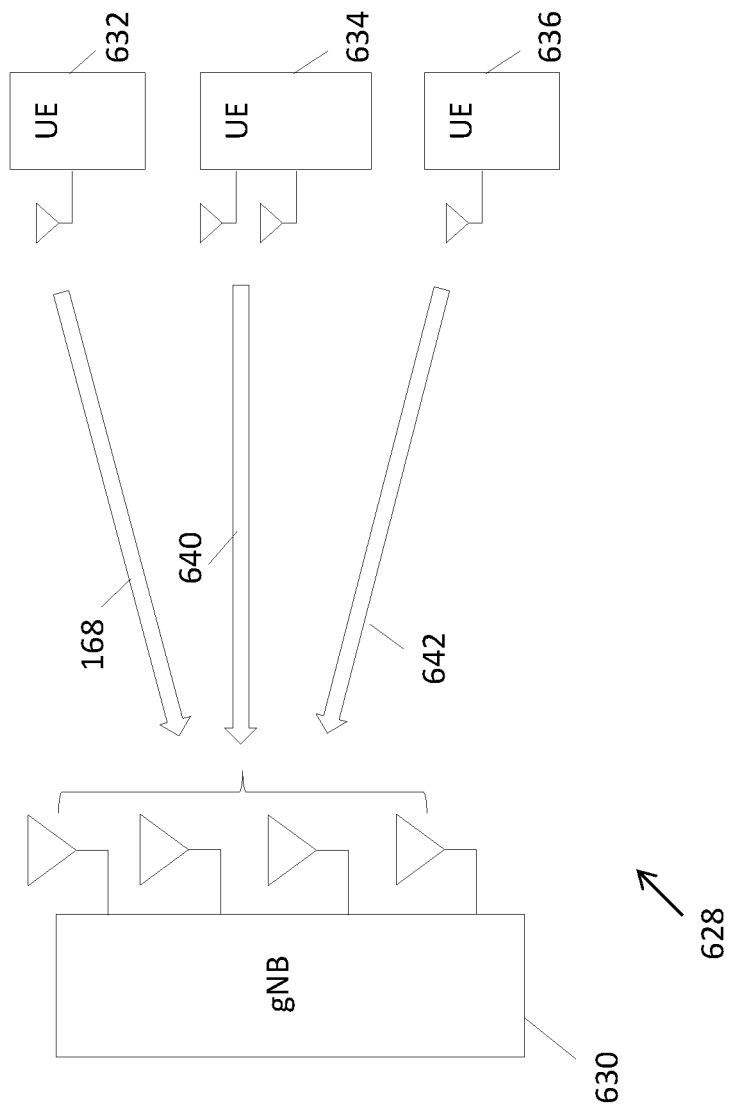
FIG. 6C depicts a schematic diagram of uplink MU-MIMO communications between a gNB and multiple UEs in a MIMO wireless network.

FIG. 6C depicts a schematic diagram of uplink MU-MIMO communications 628 between a gNB 630 and multiple UEs 632, 634, 636 in a MIMO wireless network. The MIMO wireless network may include one or more UEs (e.g. UE 632, UE 634, UE 636, etc.). In the uplink MU-MIMO communications 628, the UEs 632, 134, 136 transmits respective streams simultaneously to the gNB 630 in the network using respective antennas via spatial mapping or precoding techniques. For example, two space-time streams may be directed to the gNB 630 from UE 634, another space-time stream may be directed to the gNB 630 from UE 632, and yet another space-time stream may be directed to the gNB 630 from UE 636. For the sake of simplicity, the two space-time streams directed to the gNB 130 from UE 634 are illustrated as a grouped data transmission arrow 640, the space-time stream directed to the gNB 630 from UE 632 is illustrated as a data transmission arrow 638, and the space-time stream directed to the gNB 130 from UE 136 is illustrated as a data transmission arrow 642.

Beamforming is a signal processing technique in which an array of antennas direct signal transmission and/or reception in a wireless network to electronic devices, and identify the most efficient data-delivery route from a base station (gNB) to a UE. The signals at particular angles experience constructive interference while signals at other angles experience destructive interference. Beamforming can help massive MIMO arrays, in which MIMO uses a large-scale antenna array at one or more electronic devices (e.g., a gNB) to simultaneously transmit to numerous autonomous UEs. MIMO enables a wireless network to transmit and receive more than one data signal simultaneously over the same radio channel via a multitude of antennas and/or antenna arrays.

Some networks execute beamforming and massive MIMO techniques due to high propagation loss associated with millimeter waves used for signal transmission. In networks transmitting with beamforming, technical problems arise in establishing and maintaining a beam pair in which the transmitter-side beam direction and the receiving-side beam direction exist with sufficient connectivity. Further problems occur when this connectivity is broken or becomes insufficient. For example, an obstacle can block a direct path between the transmitter and receiver, or changes in the environment can disrupt the beam pair. For instance, beam failure occurs when an event blocks or prohibits an established beam pair (e.g., the UE moves to a location blocking wireless transmission or moves to a location out of coverage of a current serving cell). Beam recovery then executes to re-establish connectivity with a beam pair.

Example embodiments solve these technical problems and others in networks that execute beamforming. These embodiments include, but are not limited to, apparatus and methods that execute BFR. Advantages of these solutions include, but are not limited to, reducing uplink radio overhead, reducing measurement effort of BFD, simplifying execution of a BFR procedure, and expediting re-establishment of beam pair connectivity in a network.

Example embodiments include BFR for a PCell, an SCell, and groups of more than one cell, such as a group of PCell and SCell(s), a group of SCells only, or group-based SCells. The PCell refers to the cell operating on the primary frequency. For example, this cell includes the cell in which the UE either performs the initial connection establishment procedure, initiates the connection re-establishment procedure, or the cell indicated as the primary cell in a handover procedure. The SCell refers to the cell operating on a secondary frequency. For example, this cell is configured once a Radio Resource Control (RRC) connection is established and may be used to provide additional radio resources. According to various embodiments, the term "secondary cell" (or "SCell") may be used interchangeably with the term "component carrier" (or "CC").

Example embodiments further include BFR for downlink (DL), uplink (UL), and DL and UL. For example, an example embodiment specifies BFR for a SCell with both DL and UL, as well as DL-only (e.g., where the PCell operates in Frequency Range 1 (FR1) and FR2). In an embodiment, FR1 includes sub-6 GHz frequency bands, and FR2 includes frequency bands from about 24 GHz to 52 GHz.

Figure 7:
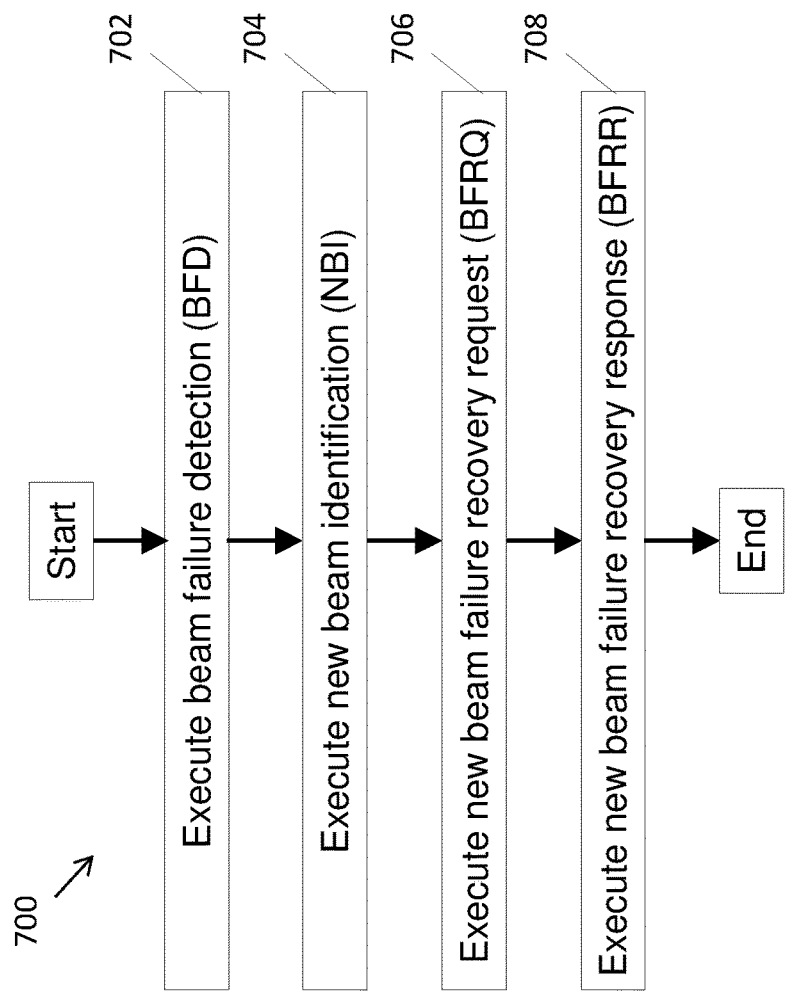
FIG. 7 depicts a beam failure recovery procedure in accordance with various embodiments.

FIG. 7 depicts a beam failure recovery (BFR) procedure 700 in accordance with various embodiments. Procedure 700 is a high-level diagram showing detection of a beam failure and recovery from this failure. This procedure includes one or more of the following steps: beam failure detection (BFD), new beam identification (NBI), beam failure recovery request (BFRQ), and beam failure recovery response (BFRR).

Block 702 states execute BFD. Beam failure can occur for various reasons. A UE can obtain radio level link quality of periodic channel state information reference signal (CSI-RS) to detect beam failure of a SCell. When the level link quality for all the corresponding CSI-RS resources is above a threshold in a time instance (this threshold is defined as the level at which the downlink radio link cannot be reliably received, and it corresponds to the block error rate outage (BLER_out) of a hypothetical downlink control channel (PDCCH) transmission), a beam failure instance (BFI) can be identified. The physical layer (PHY) provides a BFI indication to the Media Access Control (MAC) layer. The BFD procedure in MAC is dictated by a timer and a counter which calculates the number of BFI indications (BFIIs). Every time the BFI indication is received, the timer is restarted and in the case the timer expires, the counter is reset. On the other hands, after detecting $N_{max}$ (beamFail-urelnstanceMaxCount) consecutive BFIIs, the UE can declare that beam failure happens the SCell. The CSI-RS(s) can be explicitly configured to measure for the BFD by Radio Resource Control Protocol message, or implicitly configured by higher layer parameter transmission configuration indicator (TCI) state for PDCCH receptions. Channel state information (CSI) is a collection of spatial transfer functions between each antenna in the base station antenna array and the UE. The CSI information is stored, for example, in a matrix and used to encode and decode the data transmitted from and received by the antenna array.

Block 704 states execute NBI. An example embodiment determines a new beam or new beam pair to re-establish or restore connectivity between the UE and the cell. Consider an example embodiment that includes a set or series of CSI-RS or synchronization signal (SS) blocks for re-establishing connectivity. Consider an example embodiment that transmits these signals within a downlink beam. The signals represent a set of candidate beams. For example, an example embodiment measures the L1 reference signal received power (L1-RSRP) on the reference signals for a plurality of candidate beams. When the measured value of L1-RSRP exceeds a predetermined value, connectivity is restored as the reference signal corresponds to a new beam.

Block 706 states execute BFRQ. As BFRQ is not transmitted until beam failure is declared at the MAC layer. For the conventional BFR per single SCell, MAC layer beam failure is declared after $N_{max}$ are received from PHY within a timer duration of $N_{max} \times T$, where $N_{max}$ and the BFD RS periodicity T (beamFailureDetectionTimer) are separately configurable numbers. The device transmits the BFRQ to the network or device (e.g., cell) and informs the network or device that a beam failure has been detected. Information provided per the BFRQ can include information about the candidate beam.

Block 708 states execute BFRR. After execution of the BFRQ, an example embodiment monitors the downlink for a network or device response to the BFRQ. For example, the response transmits the PDCCH quasi co-location (QCL) with the resource set associated with the candidate beam included in the BFRQ. Two antenna ports are said to be quasi co-located (QCL) if properties of the channel over which a symbol on one antenna port is conveyed can be inferred from the channel over which a symbol on the other antenna port is conveyed. After the BFRQ transmits, if no response is received within a predetermined time frame or window, then the device retransmits the BFRQ.

In general, SCell BFD is based on periodic CSI-RS. After receiving a $N_{max}$ BFIIs the UE declares the BF, then BFRQ is transmitted. During BRFQ, the UE conveys BF event and reports failed SCell index(es), i.e. failed CC index(es), as well as new beam if present, where the UE reports only one new beam information per SCell is present. However, there has been little discussion on communication apparatuses and methods for beam failure recovery in context of group-based SCells.

A group of SCells may share similar beam failure condition such as statistical channel/beam properties (statistical properties of large-scale parameters), therefore the BFD for a group of SCells can be determined based on one failure of one of the SCells. This could simplify BFD and BFR when multiple SCells are configured. Further, BFR procedures include further technical challenges and problems for networks executing beamforming with a group-based SCell. By way of example, these problems include how the UE is notified to perform the group-based SCell BFR, and how the UE determines and reports the beam failure of multiple SCells based on a single identifier. Example embodiments provide technical solutions to these problems as well.

One example embodiment is a communication apparatus comprising a receiver, which receives configuration information for BFR of a plurality of SCells operating in a network, and circuitry which performs beam BFD and report based on the configuration information.

Another example embodiment is a method that includes receiving, at a communication apparatus, configuration information for BFR of multiple SCells operating in a network; and performing, by the communication apparatus, BFD and report based on the configuration information.

Figure 8:
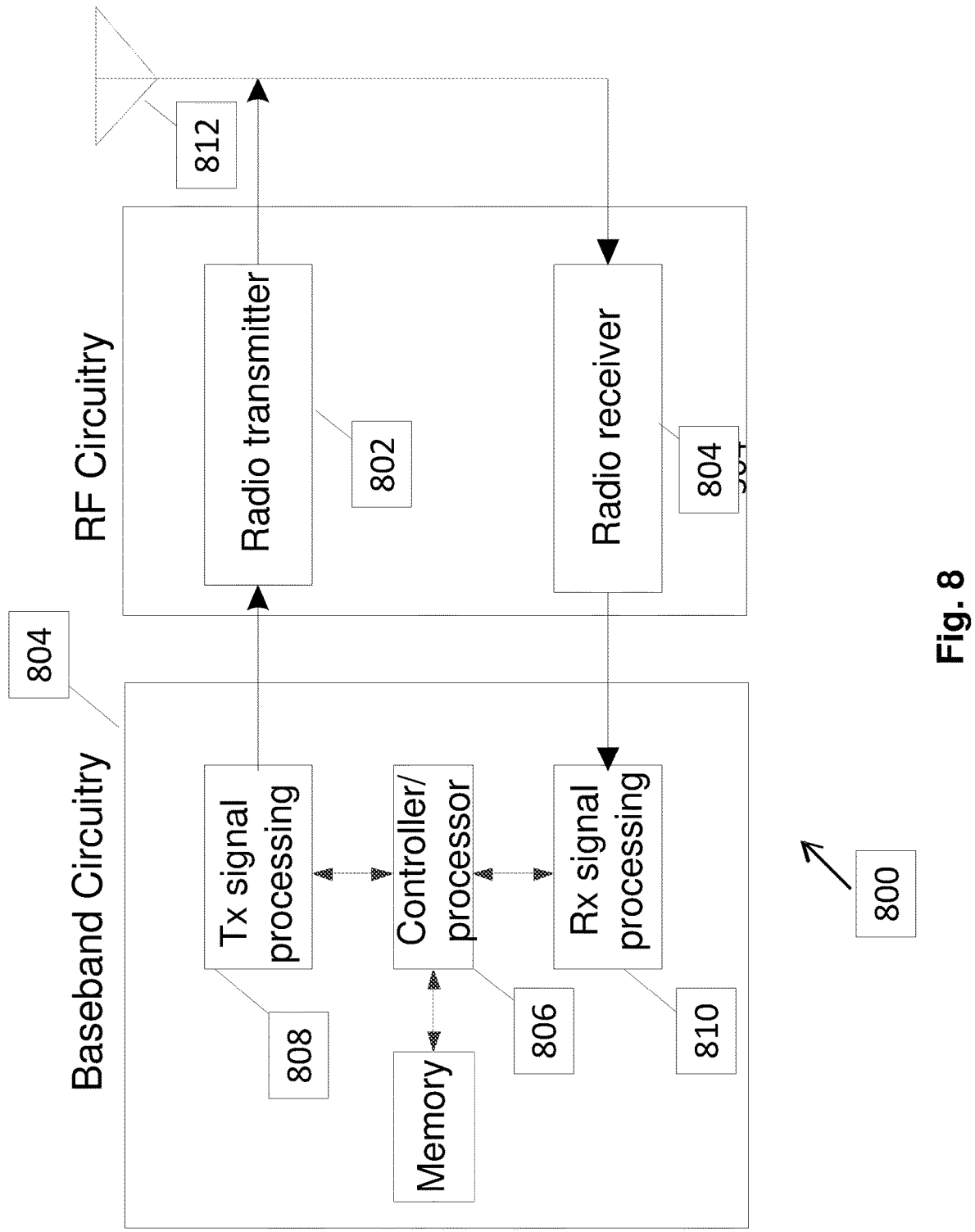
FIG. 8 shows a schematic example of communication apparatus in accordance with various embodiments. The communication apparatus may be implemented as a gNB or an UE and configured for beam failure detection and recovery in accordance with various embodiments of the present disclosure.

FIG. 8 shows a schematic, partially sectioned view of a communication apparatus 800 according to various embodiments. The communication apparatus 800 may be implemented as a gNB or a UE according to various embodiments and provide functions for beam failure recovery. As shown in FIG. 8, the communication apparatus 800 may include circuitry 814 comprising at least one receive signal generator, at least one radio transmitter 802, at least one radio receiver 304 and at least one antenna 812 (for the sake of simplicity, only one antenna is depicted in FIG. 8 for illustration purposes). The at least one radio receiver 804 may receive configuration information for BFD and BFR of a plurality of SCells operating in a network, which may include group information containing lists of component carriers of each group (explicitly or implicitly), BFD configuration information and beam failure (BF) report configuration information containing at least a group identifier for each group to be reported. The circuitry 814 may furthermore include at least one transmission signal processor 808. The circuitry 814 may also include at least one controller 806 for use in software and hardware aided execution of tasks that the at least one controller 806 is designed to perform, including control of communications with one or more other communication apparatuses in a MIMO wireless network. The at least one controller 806 may control the receive signal processor 810 and the transmission signal generator 808. The at least one controller 806 may control the receive signal processor 810 to receive the configuration information. The at least one controller 806 in the circuitry 814 may perform beam failure detection and report based on the received configuration information. The at least one radio transmitter 802 may transmit the beam failure report.

Figure 9:
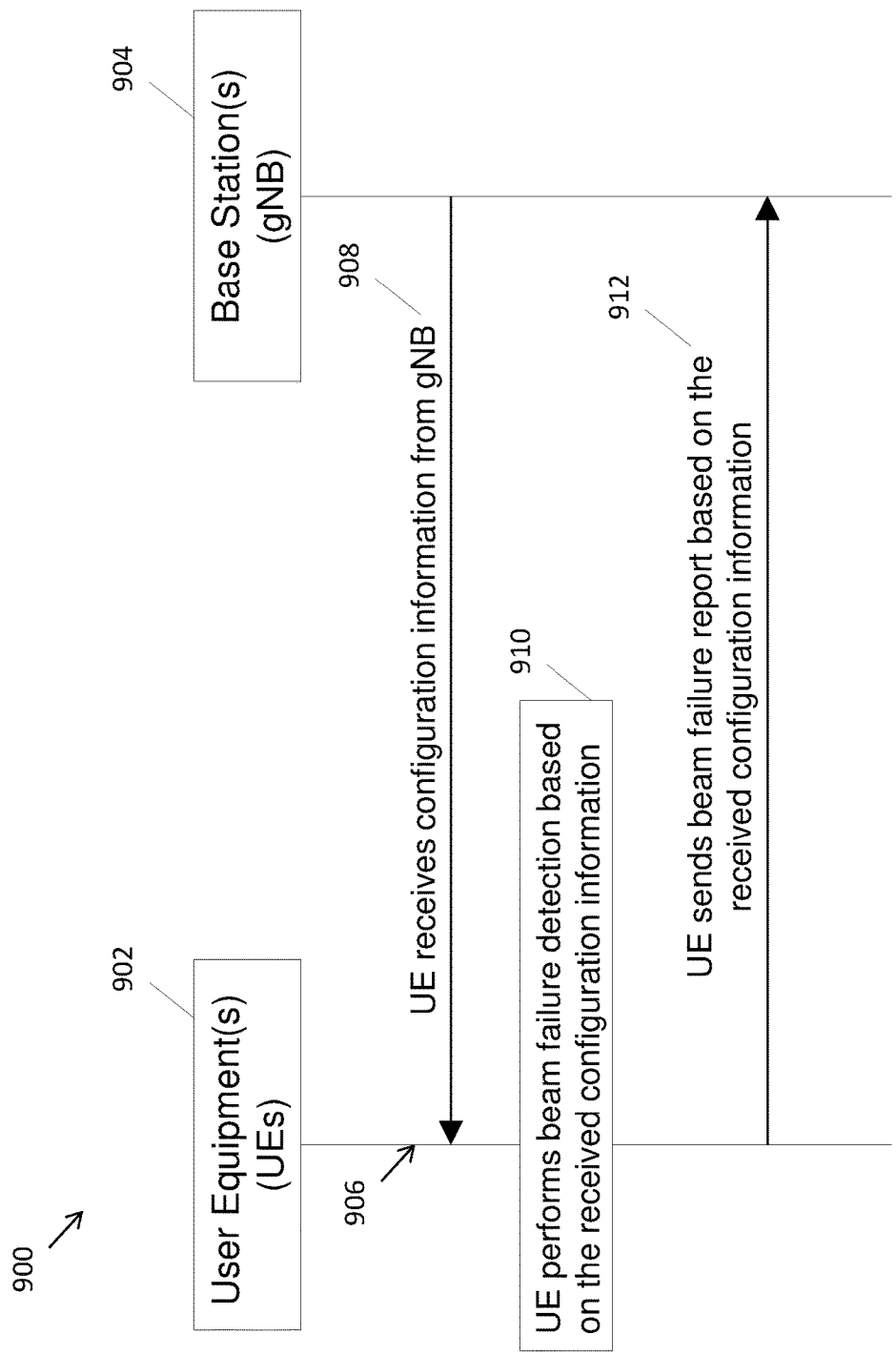
FIG. 9 shows a wireless network with one or more UEs and one or more cells or gNBs transmitting a message sequence according to an example embodiment.

FIG. 9 shows a wireless network 900 with one or more UEs 902 and one or more cells or base stations (gNB) 904 transmitting a message sequence 906 according to an example embodiment. The sequence includes the UE receiving configuration information from a gNB, the UE performing BFD, and the UE generating and transmitting a report of the beam failure to the gNB.

During initial access procedures, the UE finds a base station (e.g., a cell), receives system information, and requests connection to the cell. By way of example, this procedure includes a primary synchronization signal (PSS) and secondary synchronization signal (SSS) that enables the UE to find, identify, and synchronize to a network and/or cell.

Signal transmission between the UE(s) and cell(s) occurs via multiple antennas and/or antenna arrays to execute beamforming. Given the large number of antennas and/or antenna arrays in the network, beams are narrow and beam tracking or beam pair connection can fail. When a beam failure occurs, an example embodiment executes the message sequence 900 as a beam-recovery procedure or BFR to re-establish connectivity and a beam pair.

As shown at 908, the gNB 904 transmits configuration information to the UE 902. After receiving the configuration information, the UE executes BFD based on the configuration information received from the gNB, as shown at 910. The UE generates a BF report based on the received configuration information and transmits this report to the base station, as shown at 912.

In an example embodiment, the UE receives the configuration information for beam failure recovery of multiple base stations or cells, such as multiple SCells and/or multiple groups of cells. The UE executes BFD for these multiple cells, generates report, and transmits the report to one or more base stations or cells (e.g., the base station providing the configuration information or another base station).

Consider an example embodiment in which the multiple cells include multiple groups of SCells. The UE receives a new indication notifying the UE to perform the BFR for multiple SCells based on the group basis scenario (e.g., group of SCell(s) and PCell or group of SCells only) from the gNB. This new indication points to group-based SCell BFR configuration information (configurable per UE basic).

The configuration information includes one or more lists of component carriers (CCs) that include group information. By way of example, this group information includes one or more of an indication of the number of groups to be measured and/or reported and an indication of which groups are to be measured and/or reported.

The configuration information may also include BFD configuration information for determining the BF of the group. For example, this information is based on a minimum number of SCells having failure condition ($n_{min}$) within the group, or based on a BFII threshold per group ($N_{max}^g$).

The BFD can be executed based on at least one of (1) a number of SCells which is identified as failed within a group ($s_{bf}$)≥ a first threshold ($n_{min}$), or (2) a sum of Beam Failure Instance Indications (BFIIs) of all SCells within the group (M)≥ a second threshold ($N_{max}^g$). Here, $n_{min}$ is the minimum number of SCells having failure condition within the group, $$M = \sum_{i}^{n} N_i,$$

where $N_i$ is the value of the BFII of the ith SCell, n is the number of SCells in the group, and $N_{max}^g$ is the maximum number of BFIIs of all SCells within the group.

In an example embodiment, $n_{min}$ has a (pre-)fixed value equal to one, where the (pre-)fixed value may be configured according to a standard protocol or by a gNB. Here, the UE counts the BFII to detect the BF for each individual SCell within the group. For instance, after receiving $N_{max}$ consecutive BFIIs of a SCell, the UE determines the BF of the SCell. If any SCell within the group is identified as failed, the BF of the group is declared. No further counting of the BFII for other SCells occurs in this group. When $n_{min}$ has a (pre-)fixed value of one, several advantages result. The BFD measurement effort is reduced for the UE if the channel/beam properties of different SCells within the group are almost the same. Fixing the value of $n_{min}$ also has the benefit of reducing the dependency of the BFD computation time and computation (BFD TCC) on $N_{max}$.

In another example embodiment, $n_{min}$ has a (pre-)fixed value greater than one, where the (pre-)fixed value may be configured according to a standard protocol or by a gNB. Here, the the UE counts the BFII to detect the BF for each individual SCell within the group and $s_{bf}$. When $s_{bf} \geq n_{min}$, the UE declares that all SCells within the group are treated in a failure condition. No further counting of the BFII occurs in this group. When $n_{min}$ has a (pre-) fixed value of greater than one, several advantages result. The setting value of $n_{min}$ is consistent for the whole network. Further, this embodiment reduces the BFD measurement effort for the UE and enhances decision making of declaring the group BF if the channel/beam properties of different SCells within the group are almost same, but still have some variances. Further, another benefit includes reductions of the BFD TCC depend on $N_{max}$ and $n_{min}$.

In another example embodiment, $n_{min}$ has a flexible value. For example, $n_{min}$ is flexibly indicated by the control information depending on the UE capability, such as a higher layer signalling or a downlink control indication. For example, the value of $n_{min}$ is flexibly indicated by an information element (IE) of the UE capability. When $n_{min}$ has a flexible value, several advantages result. The setting value of $n_{min}$ is flexible and may depend on one or more factors, for example the UE capability. This embodiment reduces the BFD measurement effort for the UE and enhances decision making of declaring the group BF if the channel/beam properties of different SCells within the group are almost same, but still have some variances. Further, another benefit includes reductions of the BFD TCC depend on $N_{max}$ and $n_{min}$.

In an example embodiment, $N_{max}^g$ has a (pre-)fixed value, where the (pre-)fixed value may be configured according to a standard protocol or by a gNB. When $N_{xax}^g$ has a fixed value, several advantages result. This setting value of $N_{max}^g$ is consistent for the whole network. This embodiment reduces the BFD measurement effort for the UE if the channel/beam properties of different SCells within the group are almost same. Further, another benefit includes the reduction of BFD TCC depend on $N_{xax}^g$.

In an example embodiment, $N_{max}^g$ has a flexible value. This flexible value is indicated by the control information and may depend on one or more factors, for example the UE capability, such as a higher layer signalling or a downlink control indication. For example, the value of $N_{max}^g$ is flexibly indicated by the IE of the UE capability. When $N_{max}^g$ has a flexible value, several advantages result. The setting value of $N_{max}^g$ is flexible and may depend on one or more factors, for example the UE capability. This embodiment reduces the BFD measurement effort for the UE if the channel/beam properties of different SCells within the group are almost same. Further, another benefit includes the reductions of BFD TCC depend on $N_{xax}^g$.

In an example embodiment, the BFD operation can be based on other methods or combinations of methods. For example, the UE is indicated to use a method to perform the BFD operation for each individual group (e.g., based on a combination of $n_{min}$ or $N_{max}^g$).

Consider an example in which the BFD operation for each group is based one or more of the following five operational options: (1) a fixed value of $n_{min}$ equal to one; (2) a fixed value of $n_{min}$ greater than one; (3) a flexible value of $n_{min}$; (4) a fixed value of $N_{max}^g$; and (5) a flexible value of $N_{max}^g$.

Consider an example in which there are three groups. Here, there are multiple possibilities or options to configure the BFD operation for each individual group. For example, these options include a fixed value of $n_{min}$ equal to one, a fixed value of $n_{min}$ greater than one, and a fixed value of $N_{max}^g$ being applied for the first, second, and third groups, respectively. The second option (i.e., a fixed value of $n_{min}$ greater than one) is applied for the first and second groups, while the third option (i.e., a flexible value of $n_{min}$) is applied for the third group; etc. Subsequently, according to the received configuration information for each group, the UE uses the corresponding BFD method to perform BFD operation to determine beam failure of the particular group. This embodiment reduces the BFD measurement effort for the UE and the dependency of BFD TCC on $N_{max}$, $n_{min}$ and $N_{max}^g$.

In an example embodiment, the configuration information includes information for the BF report that is generated by the UE and transmitted to the cell. By way of example, this information includes a group identifier (such as group ID, indicated CC index, or configuration index order) for each individual group. The BF report configuration information can include an indication to report a BF event via PCell (or PsCell) UL or SCell UL (if the SCell has both DL and UL). This information can also include an indication to report new beam information if such new information is present. Further yet, this information can include one or more of the following: (1) an indication of what type of measurement information (MI) of the failed group to be reported (e.g., RSRP, signal to interference plus noise ratio (SINR)), and (2) an indication to report a reason for the BF event, if the reason is known.

The indications of the configuration information can be signalled explicitly and/or signalled implicitly to the UE. Consider an example of an implicit approach that occurs via (pre-)configured rules. For example, in the same band, if CC1 configures cross-carrier scheduling for CC3 and CC5, then a list of CCs is implicitly defined as CC1, CC3, and CC5, as well as CC1 is considered as the group identifier. Consider an example of explicit approach that occurs via the control information. For example, this approach occurs via at least Physical Downlink Control Channel Downlink Control Information (PDCCH DCI), MAC Control Elements (MAC CE), or RRC message.

The content of the BF report can include various information. For example, the UE generates and transmits the BF report that includes at least the group identifier for each individual group indicated by the configuration information. If the number of the failed groups is greater than that of the useful groups at the same time, the UE reports the useful group identifier(s). Otherwise, the UE reports the failed group identifier(s). This embodiment reduces the uplink radio overhead.

The configuration information can also be updated or changed. For example, the UE provides new beam information including a CC index, a spatial Rx parameter, and an angle of arrival (AoA) to the gNB if present. By way of example, the gNB will assign the new beam to the existing groups or a new group by comparing its own large-scale properties with that of the indicated SCells representing their groups. The gNB updates the UE with the configuration information. In an embodiment, the group-based SCell beam failure recovery configuration information can be updated periodically or aperiodically.

In an example embodiment, the configuration information shows that only an indicated SCell for each individual group is configured with the BFD reference signal(s) (BFD RS(s)) explicitly or implicitly (i.e., not all SCells within the group). Here, the UE receives a new indication notifying the UE to perform the BFR for multiple SCells based on the group basis scenario from the gNB. This new indication points to the group-based SCell BFR configuration information.

The group-based SCell BFR configuration information includes an indicated CC (SCell) is configured to perform BFD and report for each individual group. Here, only this indicated SCell is configured with the BFD reference signal(s) (BFD RS(s)) explicitly or implicitly for each individual group (i.e., not all SCells within the group). By doing so, it can reduce the downlink BFD RS. In addition, other BFR resources could also be saved as the gNB only needs to locate the BFR resources on one CC within the CC group. In this case, the list of CCs may not be required to be known to UE, and the group identifier can be the indicated CC index or the configuration index order. Similarly, the gNB can also configure SCell BFD RS over more than one CC within CC group and the configuration information can indicate which CC to perform BFD and report based on the UE capability and/or channel condition.

According to the received group-based SCell BFR configuration information pointed by the new indication, the UE only counts the BFII of the indicated SCell for each individual group. If the indicated SCell is identified as failed, the BF of the group is declared. All SCells within the group are treated in the failure condition.

According to the received group-based SCell BFR configuration information pointed by the new indication, if the number of the failed groups is greater than that of the useful groups at the same time, the UE reports the useful group identifier(s). Otherwise, the UE reports the failed group identifier(s). This example embodiment has several advantages. For example, the embodiment reduces the downlink BFD RS overhead and reduces the uplink radio overhead. The embodiment also reduces the BFD measurement effort for the UE and simplifies the BFR procedure.

In an example embodiment, all the SCells of different groups can be configured with their own BFD RS(s) explicitly or implicitly, while there is a possibility that only the indicated SCell of each individual group is configured with BFD RS(s) explicitly or implicitly in particular cases.

Example embodiments include different group-based SCell BFR configuration information. FIG. 10 shows configuration information 1000 for BFR for multiple SCells based on the group basic scenario according to an example embodiment. FIG. 11 shows a table 1100 of group-based SCell BFR configuration information according to an example embodiment.

As shown in FIGS. 10 and 11, the group-based SCell BFR configuration information is indicated explicitly in the SCellBFRConfigInfo IE and Group-basedSCellBFRInfo-IE in the following: Where maxGroupNr is the maximum number of groups, maxNrofSCell is the maximum number of SCells, and RSRP-Range is the range of RSRP. The results are shown in Table 1100.

One of ordinary skill in the art will appreciate that the data in FIGS. 10 and 11 is exemplary. There can be number of other possibilities in term of size of table, data presented, etc., depending on the UE capability. From UE perspective, an example of the capability IE of the group-based SCell BFR operation can be shown as ENUMERATED {SCell-basedBFRInfo, Group-basedSCellBFRInfo, both}, where "SCell-basedBFRInfo" indicates that a UE supports the BFR per single SCell basis; "Group-basedSCellBFRInfo" indicates that the UE supports group-based SCell BFR; and "both" indicates that the UE support both the BFR per SCell and the group-based SCell BFR.

Example embodiments can be applied to various scenarios in which the BFR reference signals are configured explicitly by the RRC or implicitly by the TCI state. For example, with explicit configuration by the RRC, the BFD RS is transmitted in the current SCell. For example, with implicit configuration by the TCI state, the BFD RS is transmitted in an active bandwidth part (BWP) of either the current SCell or another SCell.

Figure 12:
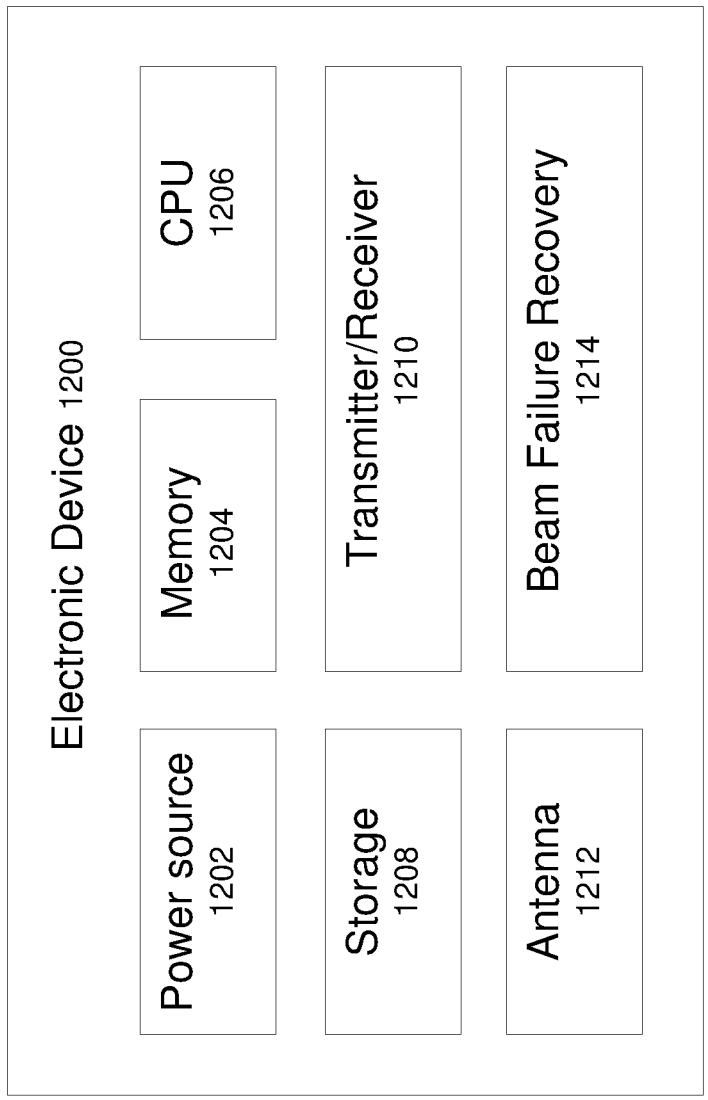
FIG. 12 shows an electronic device in accordance with an example embodiment.

FIG. 12 shows an example of an electronic device 700 in accordance with an example embodiment.

The electronic device 1200 includes a power source 1202, memory 1204, central processing unit (CPU) 1206, storage 1208, wireless transmitter and/or receiver 1210, antennas 1212 (such as one or more antenna arrays or multiple antennas for executing beamforming), and BFR 1214 (such as hardware and/or software to execute one or more example embodiments discussed in connection with FIGS. 6-11).

Consider an example embodiment in which the electronic device 1200 is UE, AP, STA, base station, cell, or other electronic device.

The BFR 1214 of the electronic device 1200 includes hardware (e.g., circuity) and/or software (e.g., code, instructions, or data) that operates to execute one or more of receiving configuration information for BFR of multiple SCells operating in a network, performing BFD based on the configuration information, generating a BF report based on the configuration information, and transmitting the BF report to another electronic device. The BFR 1214 also operates to execute one or more of BFD, NBI, BFRQ, and BFRR.

Example embodiments can be implemented in various types of wireless networks that execute beamforming, such as 5G New Radio (NR), mobile networks, et al. Such networks include multiple transmission and/or reception antennas for beamforming. Channel state information is obtained via transmission of CSI reports based on CSI reference signals in the downlink and the uplink.

The present disclosure can be realized by software, hardware, or software in cooperation with hardware. Each functional block used in the description of each embodiment described above can be partly or entirely realized by large-scale integration (LSI) such as an integrated circuit, and each process described in each embodiment may be controlled partly or entirely by the same LSI or a combination of LSIs. LSI is a process of integrating a large number of transistors on a silicon semiconductor microchip or chip, and can include very large scale integration (VLSI) and ultra large scale integration (ULSI). The LSI may be individually formed as chips, or one chip may be formed to include a part or all the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module including amplifiers, RF modulators/demodulators and the like, and one or more amplifiers, RF modulators/demodulators and the like, and one or more antennas. The processing/control circuitry may include power management circuitry which may comprise dedicated circuitry, a processor and instructions for power management control as either firmware or instructions stored in a memory coupled to the processor.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (e.g., digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus may also include an infrastructure facility, such as a base station, an access point, and any other apparatus, device or system that communicates with or controls apparatuses such as those in the non-limiting examples provided herein.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the present disclosure in any way. Rather, the foregoing detailed description will provide those skilled in the art with a convenient road map for implementing exemplary embodiments, it being understood that various changes may be made in the function and arrangement of the network and/or the UE transceiving apparatus described in the exemplary embodiments without departing from the scope of the present disclosure as set forth in the appended claims.

Other example embodiments include but are not limited to the following examples:

A communication apparatus comprising: a receiver, which, in operation, receives configuration information for BFR of a plurality of SCells operating in a network; and circuity, which, in operation, performs BFD and report based on the configuration information.

Per the example embodiment, the configuration information includes a list of CCs.

Per the example embodiment, the BFD is performed based on at least one of: (1) a number of the plurality of SCells that have been identified as a failure within a group $(s_{bf}) \geq$ a threshold $(n_{min})$, where $n_{min}$ is a minimum number of the plurality of SCells having a failure condition within the group; or (2) a sum of BFIIs of SCells within a group $(M) \geq$ a threshold $(N_{max}{}^g)$, where $$M = \sum_i^n N_i,$$

$N_i$ is a value of the BFII of an ith SCell, n is a number of the SCells in the group, and $N_{max}^g$ is a maximum number of the BFIIs of the SCells within the group.

Per the example embodiment, the threshold ($n_{min}$) is (pre-)fixed as one, is further configured to count the BFIIs for each of the SCells within the group and declare a beam failure (BF) of the group if any of the SCells within the group is identified as a failure.

Per the example embodiment, the threshold ($n_{min}$) is (pre-)fixed as more than one, is further configured to count the BFIIs to detect a BF for each of the SCells within the group, and declare the SCells within the group in a failure condition when $s_{bf} \geq n_{min}$.

Per the example embodiment, the threshold ($n_{min}$) is flexibly indicated by a control information depending on a capability of the communication apparatus that includes a higher layer signaling or a downlink control indication.

Per the example embodiment, $N_{max}^g$ is a (pre-)fixed value.

Per the example embodiment, $N_{max}^g$ is a flexible value indicated by a control information depending on a capability of the communication apparatus that includes a higher layer signaling or a downlink control indication.

Per the example embodiment, a method based on $n_{min}$ or $N_{max}^g$ to perform the BFD for each group is indicated.

Per the example embodiment, the configuration information includes a group identifier comprising a group identity (ID), an indicated CC index, or a configuration index order for each group.

Per the example embodiment, indications of the configuration information are signaled based on at least one of the following: through a (pre-)configured rule, a control information through at least a physical PDCCH DCI, a MAC CE, or a RRC message.

Per the example embodiment, the BF report content includes at least the group identifier for each group indicated by the configuration information.

Per the example embodiment, the communication apparatus is further configured to provide new beam information including a CC index, a spatial Rx parameter, and an AoA.

Per the example embodiment, the configuration information includes at least an indicated SCell to perform the BFD and report for each individual group, wherein only the indicated SCell(s) can be configured with BFD reference signal(s) explicitly or implicitly.

Per the example embodiment, if a number of failed groups is greater than that of useful groups at a same time, the communication apparatus reports the identifiers of the useful groups; otherwise the communication apparatus reports the failed groups.

Another example embodiment is a communication method, comprising: receiving, at a communication apparatus, configuration information for BFR of multiple SCells operating in a network; and performing, by the communication apparatus, BFD and report based on the configuration information.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing exemplary embodiments of the disclosure, it being understood that various changes may be made in the function and arrangement of steps and method of operation described in the exemplary embodiments without departing from the scope of the disclosure as set forth in the appended claims.

What is claimed is:

1. A communication apparatus comprising:
   a receiver, which, in operation, receives (1) group information indicating one or more component carriers included in a group of secondary cells (SCells) and (2) configuration information for a beam failure recovery (BFR) of the group of SCells, and (3) an identifier for the group of SCells; and
   a transmitter, which, in operation, transmits reporting information a result of beam failure detection (BFD) based on (1) the group information, (2) the configuration information and (3) the identifier for the group of SCells.

2. The communication apparatus of claim 1, wherein the reporting information includes indices of failed SCells, which are identified as failed in the BFD.

3. The communication apparatus of claim 2, wherein the reporting information includes the new beam information for each of the failed SCells, which are identified as failed in the BFD.

4. The communication apparatus of claim 1, wherein the reporting information is transmitted in a case a number of beam failure instance (BFI) of any SCell in the group of SCells is equal to or larger than a first threshold that is indicated by a base station.

5. The communication apparatus of claim 1, wherein the reporting information is transmitted in a case a number of SCells in the group of SCells, which are identified as failed in the BFD, is equal to or larger than one.

6. The communication apparatus of claim 1, wherein the reporting information is transmitted in a case a number of SCells in the group of SCells, which are identified as failed in the BFD, is equal to or larger than a second threshold that is indicated by a base station.

7. The communication apparatus of claim 1, wherein the configuration information indicates reporting configuration of the BFD.

8. The communication apparatus of claim 1, wherein the configuration information includes information on a BFD reference signal (RS).

9. A communication method comprising:
   receiving (1) group information indicating one or more component carriers included in a group of secondary cells (SCells) and (2) configuration information for a beam failure recovery (BFR) of the group of SCells and (3) an identifier for the group of SCells; and
   transmitting reporting information including a result of beam failure detection (BFD) based on (1) the group information, (2) the configuration information and (3) the identifier for the group of SCells.

10. The communication method of claim 9, wherein the reporting information includes indices of failed SCells, which are identified as failed in the BFD.

11. The communication method of claim 10, wherein the reporting information includes new beam information for each of the failed SCells, which are identified as failed in the BFD.

12. The communication method of claim 9, wherein the reporting information is transmitted in a case a number of beam failure instance (BFI) of any SCell in the group of SCells is equal to or larger than a first threshold that is indicated by a base station.

13. The communication method of claim 9, wherein the reporting information is transmitted in a case a number of SCells in the group of SCells, which are identified as failed in the BFD, is equal to or larger than one.

14. The communication method of claim 9, wherein the reporting information is transmitted in a case a number of SCells in the group of SCells, which are identified as failed in the BFD, is equal to or larger than a second threshold that is indicated by a base station.

15. The communication method of claim 9, wherein the configuration information indicates reporting configuration of the BFD.

16. The communication method of claim 9, wherein the configuration information includes information on a BFD reference signal (RS).

\* \* \* \* \*